(12) United States Patent
Horie (10) Patent No.: US 7,181,000 B2
(45) Date of Patent: Feb. 20, 2007

(54) VOICE TRANSMISSION DEVICE AND VOICE TRANSMISSION SYSTEM

(75) Inventor: Nobuyoshi Horie, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 252 days.

(21) Appl. No.: 10/515,637

(22) PCT Filed: Apr. 4, 2003

(86) PCT No.: PCT/JP03/04359

§ 371 (c)(1),
(2), (4) Date: Dec. 7, 2004

(87) PCT Pub. No.: WO2004/091183

PCT Pub. Date: Oct. 21, 2004

(65) Prior Publication Data
US 2005/0175191 A1    Aug. 11, 2005

(51) Int. Cl.
*H04M 9/08* (2006.01)
(52) U.S. Cl. .................... 379/406.01; 379/388.04; 379/392.01; 370/351; 370/395.6; 370/492; 704/201; 704/221
(58) Field of Classification Search .......... 379/406.01, 379/67.1–87, 387.01–398; 370/351–385, 370/395.6–395.61
See application file for complete search history.

(56) References Cited

U.S. PATENT DOCUMENTS 5,867,815 A * 2/1999 Kondo et al. ................ 704/228

6,581,032 B1 * 6/2003 Gao et al. .................... 704/222

FOREIGN PATENT DOCUMENTS

| EP | 1 124 343 | 8/2001 |
|---|---|---|
| EP | 1124343 A2 * | 8/2001 |
| JP | 03-226145 | 10/1991 |
| JP | 2001-224086 | 8/2001 |

* cited by examiner

*Primary Examiner*—Fan Tsang
*Assistant Examiner*—Ramnandan Singh
(74) *Attorney, Agent, or Firm*—Oblon, Spivak, McClelland, Maier & Neustadt, P.C.

(57) ABSTRACT

A voice transmission device has a tandem pass through function in an STM, ATM, IP network, and a noise canceller (21) is provided at a latter stage of an echo canceller (12) in a coding part, and in a case where a multistage connection state does not occur, noise removal is performed to carry out efficient coding, and in a case where a relay is performed in the multistage connection state, switching is performed to stop the operation of the noise canceller (21), and voice deterioration by redundant decoding and coding is prevented, and therefore, even in a cellular phone having no noise cancel function, or the like, and at both a normal time and a time of a tandem pass through state, high quality voice transmission can be performed, and further, since an unvoiced portion in voice data is increased by removing a noise component, a portion subjected to coding becomes small, and transmission amount of the line is reduced.

2 Claims, 5 Drawing Sheets

VOICE TRANSMISSION DEVICE AND VOICE TRANSMISSION SYSTEM

TECHNICAL FIELD

The present invention relates to a voice transmission device and a voice transmission system applied to a network using synchronous transmission mode (STM), asynchronous transmission mode (ATM) or Internet protocol (IP).

BACKGROUND ART

Figure 3:
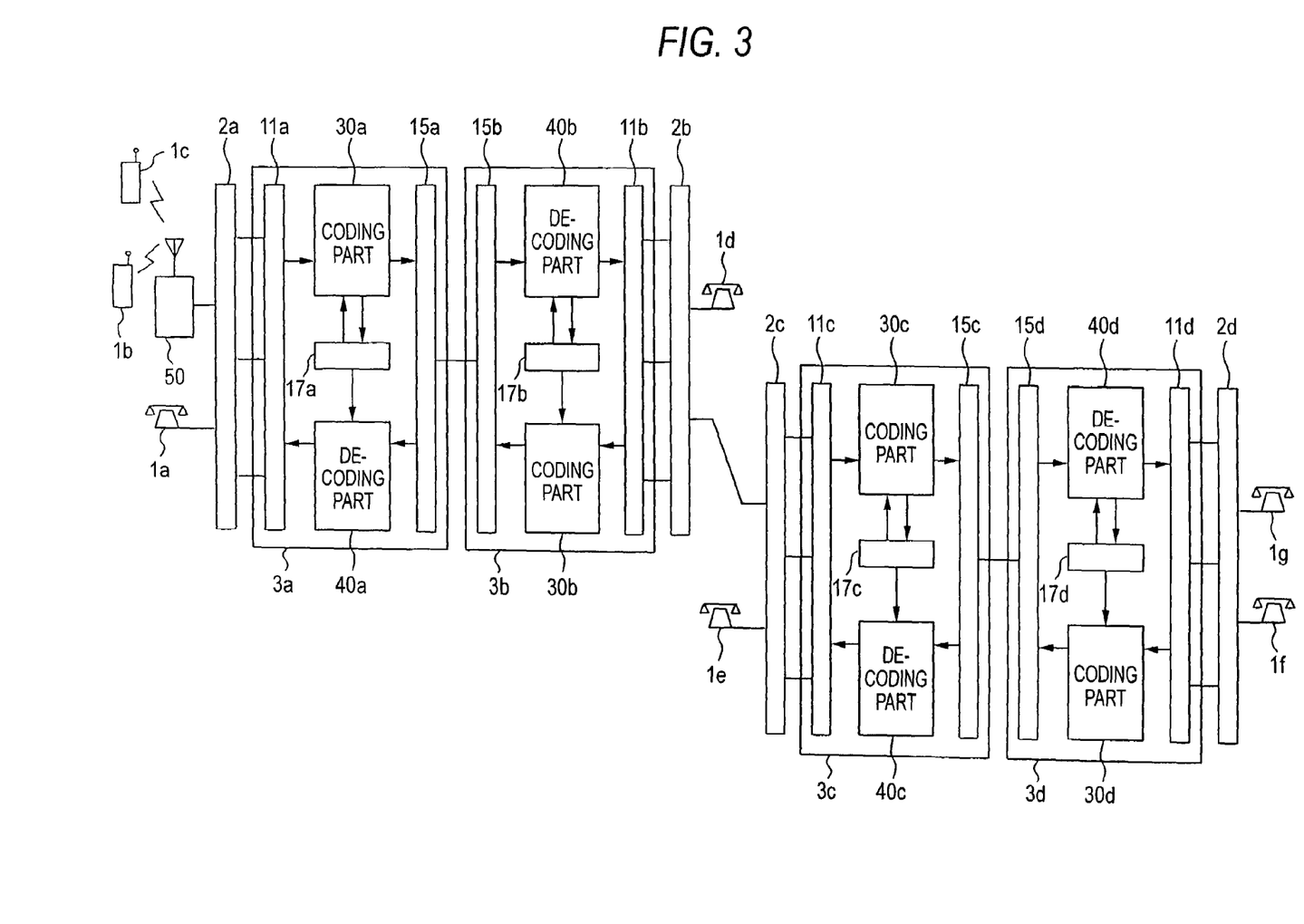
FIG. 3 is a diagram showing that plural DCMEs have formed a tandem pass through state.

For example, in the case where an international call or the like is made, voice quality becomes a problem. As means for preventing the deterioration of the voice quality in such a long-distance call, there is a tandem pass through function. FIG. 3 is a diagram showing a transmission mode of voice signals by a general tandem pass through function.

As shown in FIG. 3, one side of a DCME (digital circuit multiplication equipment) 3a as a kind of voice transmission device is connected to a terminal 1a through an exchange 2a, and the other side thereof is connected to a DCME 3b. Each of the DCMEs 3a, 3b, 3c and 3d has the tandem pass through function. As expressed in a block diagram indicating a structure of a conventional DCME shown in FIG. 4, the respective DCMEs 3a, 3b, 3c and 3d include subscriber side I/F parts 11a, 11b, 11c and 11d, echo cancellers 12a, 12b, 12c and 12d, voiced/unvoiced detection parts 13a, 13b, 13c and 13d, voice coders 14a, 14b, 14c and 14d, line side I/F parts 15a, 15b, 15c and 15d, bit detection parts 16a, 16b, 16c and 16d, tandem pass through detection parts 17a, 17b, 17c and 17d, voice decoders 18a, 18b, 18c and 18d, signal synthesis parts 19a, 19b, 19c and 19d, and pattern bit generation parts 20a, 20b, 20c and 20d, respectively.

Figure 4:
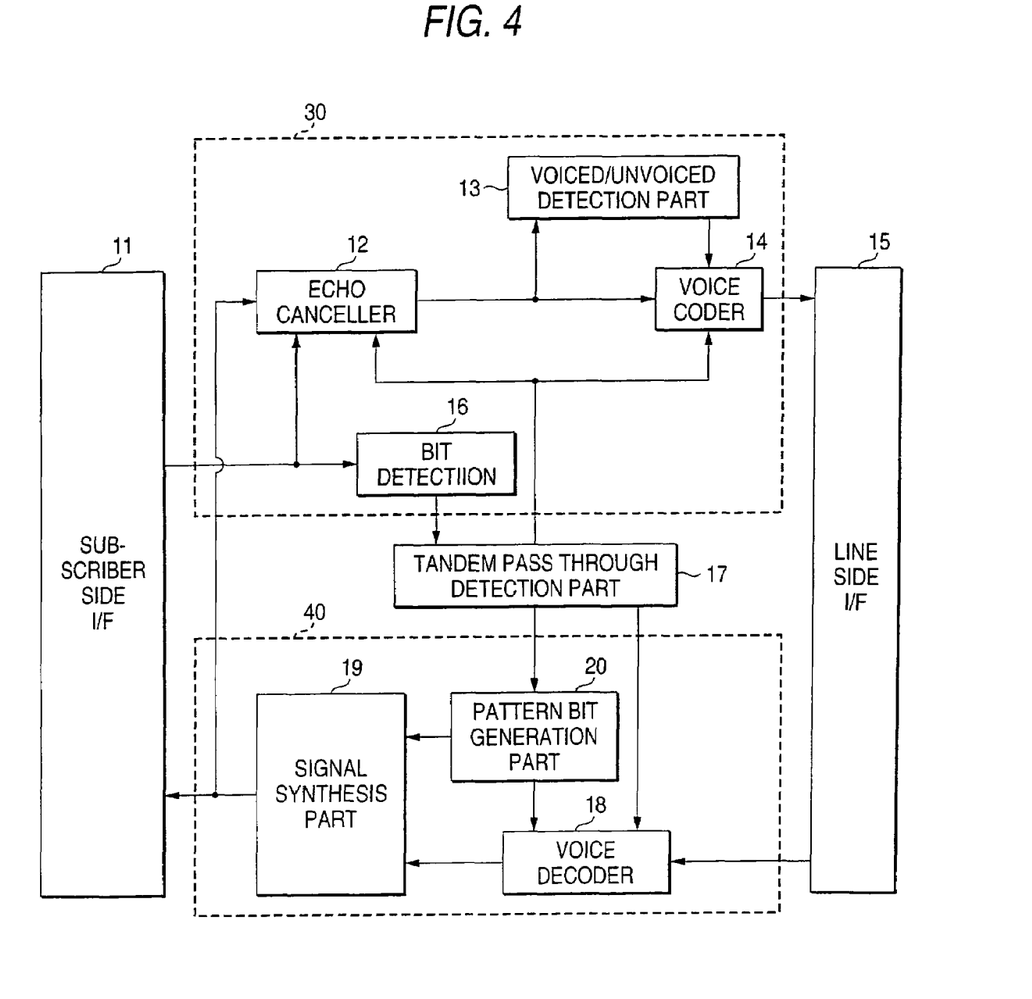
FIG. 4 is a block diagram showing a structure of a conventional DCME.

First, a case where the tandem pass through function is not used, for example, a case where a voice call is made from a terminal 1a to a terminal 1d will be described. A voice call signal of the terminal 1a is inputted to the DCME 3a through an exchange 2a, and is coded in the coding part 30a. When inputted to the DCME 3b at the other end by wire, it is decoded in the decoding part 40b and is returned to original voice data, and voice is reproduced through an exchange 2b by the terminal 1d at the other end.

On the contrary, a voice call signal from the terminal 1d at the other end is inputted to the DCME 3b through the exchange 2a, is coded in the coding part 30b, is inputted to the DCME 3a by wire, is decoded in the decoding part 40a and is returned to the original voice data, and voice is reproduced through the exchange 2b by the terminal 1a.

In general, two such DCMEs form a pair and perform a call operation with the terminal at the other end. However, for example, like a case where with respect to the terminal 1a, a terminal at the other end becomes a terminal 1f, in the case where a call operation in a multistage connection state (in this case, two-link connection) is performed by an international call or the like, it is necessary to use the exchanges 2a, 2b, 2c and 2d and the DCMEs 3a, 3b, 3c and 3d. At that time, since decoding and coding are performed at each stage of the DCMEs 3b and 3c, the voice quality is deteriorated by that.

Thus, when a voice call signal transmitted from the terminal 1a to the terminal 1f is not decoded in the decoding part 40b of the DCME 3b, and is not coded in the coding part 30c of the DCME 3c, the voice call signal is merely coded in the coding part 30a of the DCME 3a, and is decoded in the decoding part 40d of the DCME 3d, and therefore, the deterioration of the voice quality can be suppressed.

Then, a case where a voice call is performed between the terminal 1a and the terminal 1f will be described. First, the voice call signal from the terminal 1a is inputted to the DCME 3a through the exchange 2a. In general, plural 2.048 MHz (E1) signal lines or 1.544 MHz (T1) signal lines based on ITU-T recommendation G.703/G.704 are inputted from the exchange side to the subscriber side I/F part 11a for capturing the signal from the subscriber side exchange 2a. In the signal lines, in general, one line is multiplexed into 30 channels of voice signals in the case of E1, and one line is multiplexed into 24 channels in the case of T1. The subscriber side I/F part 11 decomposes the inputted voice signal for each channel, and inputs it to the coding part 30a.

In the coding part 30a, the voice call signal is first inputted to the echo canceller 12a and the bit detection part 16a. In the echo canceller 12a, an echo cancel processing is performed, and the signal after the processing is inputted to the voiced/unvoiced detection part 13a and the voice coder 14a. The voiced/unvoiced detection part 13a judges a voiced part and an unvoiced part of the voice call signal, and outputs the judgment result to the voice coder 14a. The voice coder 14a performs coding of only the voiced part from the inputted voice call signal and the voiced and unvoiced judgment result.

Figure 5:
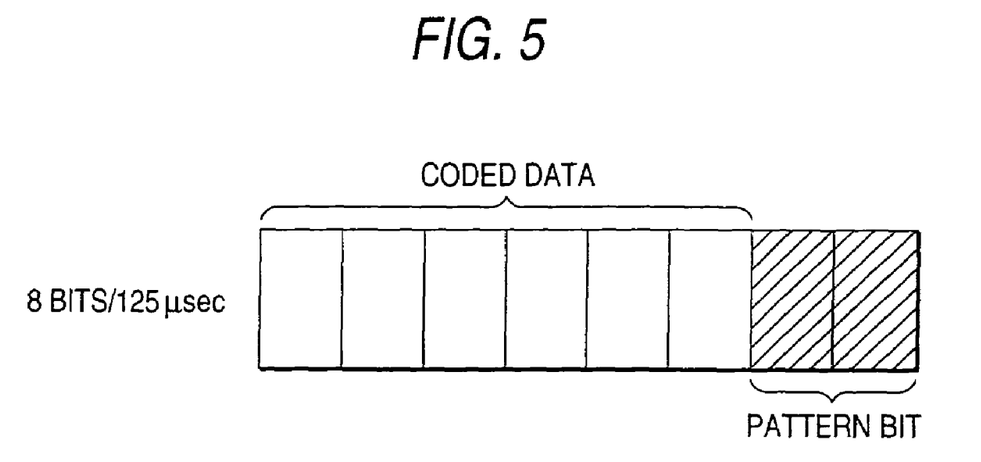
FIG. 5 is a diagram showing a tandem pass through state establishment bit pattern contained in voice data or a detected bit pattern.

On the other hand, in the bit detection part 16a, as shown in FIG. 5, predetermined two bits in the 8-bit basic cell of the PCM signal as the voice call signal are extracted, and the extracted two bits are outputted to the tandem pass through detection part 17a. In the tandem pass through detection part 17a, the extracted 2-bit signal is stored, and it is detected whether in a state of time-series arrangement, there is an establishment pattern of a predetermined tandem pass through state. However, in this case, in the DCME 3a, since the voice call signal from the terminal 1a is merely sent, the establishment pattern is not detected. Accordingly, the echo canceller 12a and the voice coder 14a continue to operate as long as a call is performed.

From the above, the voice call signal coded by the voice coder 14a is outputted to the decoding part 40b of the DCME 3b from the line side I/F part 15a by wire.

The coded voice call signal inputted to the decoding part 40b of the DCME 3b is inputted to the voice decoder 18b in the decoding part 40b until the tandem pass through state is established, and decoding of the voice is performed. The decoded voice is inputted to the signal synthesis part 19b, is synthesized every two bits with the establishment bit pattern indicating the establishment of the tandem pass through state, which is generated in the pattern bit generation part 20b in the decoding part 40b and is to be transmitted to the DCME 3c, and is outputted from the subscriber side I/F part 11b to the coding part 30c of the DCME 3c by wire. The establishment bit pattern is a specific pattern constructed of a predetermined number of bits, and is sequentially embedded every two bits in the 8-bit basic cell of the PCM signal as the voice call signal in the signal synthesis part 19b.

On the other hand, in the case where the tandem pass through state is established between the DCME 3b and the DCME 3c, the operation of the voice decoder 18b is stopped by the control signal from the tandem pass through detection part 17b. An operation at the time when this tandem pass through state is established will be described.

As described above, at the time of start of a call, that is, in the case where the tandem pass through state is not established, the voice call signal including the establishment bits is outputted from the decoding part 40b of the DCME 3b to the coding part 30c of the DCME 3c, and on the other hand, the voice call signal including the establishment bits is outputted also from the decoding part 40c of the DCME 3c to the coding part 30c of the DCME 3b.

When detecting the reception of the establishment bit pattern from the DCME 3c by the extraction of the bit detection part 16b of the DCME 3b, the tandem pass through detection part 17b immediately outputs a control signal to the pattern bit generation part 20b in the decoding part 40b of the DCME 3b, and the pattern bit generation part 20b outputs a detected bit pattern different from the establishment bit pattern in pattern. The DCME 3c also receives the establishment bit pattern from the DCME 3b, so that the detected bit pattern is outputted from the decoding part 40c to the coding part 30b of the DCME 3b.

In this way, the detected bit pattern is outputted from the coding part 30b of the DCME 3b to the decoding part 40c of the DCME 3c, and the detected bit pattern from the coding part 30c of the DCME 3c is inputted to the decoding part 40b of the DCME 3b. As stated above, when there occurs a state in which both the coding part 30b and the decoding part 40b output the detected bit patterns and receive them, the tandem pass through detection part 17b judges that the tandem pass through state is established, outputs the control signal to the echo canceller 12b, the voice coder 14b, and the voice decoder 18b, stops the operations of these, and performs a control so that the inputted signal is outputted as it is. After that, until the time of the end of the call, as long as the state continues in which both the coding part 30b and the decoding part 40b output the detected bit patterns and receive them, the operations of the echo canceller 12b, the voice coder 14b, and the voice decoder 18b are stopped, and the inputted signal is outputted as it is.

In the coding part 30c of the DCME 3c, at the time of the start of the call, that is, when the tandem pass through state is not established, the voice call signal in which the establishment bit pattern is inserted is inputted to the echo canceller 12c and the bit detection part 16c.

The bit detection part 16c extracts the predetermined two bits and outputs them to the tandem pass through detection part 17c. The tandem pass through detection part 17c stores the extracted bits, and detects the establishment bit pattern transmitted from the DCME 3b, and when detecting, it immediately controls the pattern bit generation part 20c in the decoding part 40c, and changes the output of the establishment bit pattern to the output of the detected bit pattern. In this way, similarly to the above, when the state occurs in which the decoding part 40c of the DCME 3c outputs the detected bit pattern to the coding part 30b of the DCME 3b, and the detected bit pattern is inputted in the coding part 30c of the DCME 3c from the decoding part 40b of the DCME 3b, the tandem pass through detection part 17c first stops the operation of the echo canceller 12c, the voice coder 14c and the voice decoder 18c, and outputs the control signal so that the inputted signal is outputted as it is.

In this way, before the establishment of the tandem pass through state, the coding part 30c of the DCME 3c codes only the voiced part of the voice call signal, and outputs it to the decoding part 40d of the DCME 3d, and after the establishment of the tandem pass through state, the coding part outputs the inputted signal to the decoding part 40d of the DCME 3d as it is.

In the decoding part 40d of the DCME 3d, the coded voice call signal is inputted to the voice decoder 18d through the line side I/F part 15d, is decoded by the voice decoder 18d and is outputted to the signal synthesis part 19d. In the signal synthesis part 19d, the voice call signal is synthesized with the establishment bit pattern indicating the establishment of the tandem pass through state and generated in the pattern bit generation part 20d in the decoding part 40d, and is outputted to the terminal 1f through the exchange 2d from the subscriber side I/F part 11d. The establishment bits synthesized here and outputted to the terminal 1f are neglected at the time of voice reproduction. As stated above, the decoding part of each of the DCMEs outputs the establishment bit pattern irrespective of whether the party at the other end is a terminal or another DCME.

In the above, although the operation concerning the outward path from the terminal 1a to the terminal 1f has been described, the return path will next be described.

The voice call signal from the terminal if is outputted through the exchange 2d to the coding part 30d of the DCME 3d, and similarly to the case of the DCME 3a of the outward path, its echo component is removed by the echo canceller 12d, only its voiced part is subjected to the coding processing by the voiced/unvoiced detection part 13d and the voice coding part 14d, and it is outputted to the decoding part 40c of the next stage DCME 3c.

The decoding part 40c establishes the tandem pass through state as described above. Accordingly, just after the call start and before the establishment of the tandem pass through state, the voice is decoded by the voice decoder 18c, the pattern bit generation part 20c outputs the establishment bit pattern, the establishment bit pattern is inserted in the voice call signal in the signal synthesis part 19c, and it is outputted to the coding part 30b of the DCME 3b. On the other hand, after the establishment of the tandem pass through state, by the control of the tandem pass through state detection part 17c, the voice decoder 18c does not perform the decoding processing, and is switched to such an operation that the inputted signal is outputted as it is. The pattern bit generation part 20c outputs the detected bit pattern to the signal synthesis part 19c. In the signal synthesis part 19c, the signal not subjected to the decoding processing and the detected bit pattern are synthesized, and are outputted to the coding part 30b of the DCME 3b.

The establishment of the tandem pass through state of the DCME 3b is as described above. In the coding part 30b of the DCME 3b, similarly to the case of the DCME 3c of the outward path, before the establishment of the tandem pass through state, only the voiced part of the voice call signal is coded and the signal is outputted to the decoding part 40a of the DCME 3a, and after the establishment of the tandem pass through state, the inputted signal is merely outputted to the decoding part 40a of the DCME 3a as it is.

In the decoding part 40a of the DCME 3a to which the outputted voice call signal is inputted, similarly to the above, the inputted voice call signal is decoded and is outputted to the terminal 1a. Since only the voice call signal from the terminal 1a is inputted to the coding part 30a of the DCME 3a, the tandem pass through state is not established as stated above, and accordingly, the decoding operation is not stopped in the decoding part 40a of the DCME 3a.

As described above, with respect to the establishment of the tandem pass through state, the establishment bit patterns are outputted from the respective decoding parts, the detected bit pattern is returned in the case where the other DCME receives the establishment bit pattern, and the tandem pass through state is made to have been established during the period when the detected bit patterns are mutually outputted. Accordingly, immediately after the call start, coded voice is transmitted plural times, however, since the tandem pass through state is immediately established, there is substantially no influence at the time of the call.

By doing so, eventually, even in the case where the DCMEs for two links are connected to one another, the voice data from the terminal 1a to the terminal 1f is subjected to the voice coding and decoding only once in the DCMEs 3a and 3d, and accordingly, the deterioration of the voice quality can be prevented.

The conventional DCME with the tandem pass through function as stated above performs such a processing that the voiced part of the voice signal is detected by using the voiced/unvoiced detection part 13 of FIG. 4, and only the voiced portion is compressed and coded, and is transmitted to the line side. Thus, in the case where the voiced ratio (ratio of the voiced time to all call time) of the voice signal from the subscriber side is high, the transmission amount to the line side is eventually increased.

In general, in a call made using an indoor fixed phone, the voiced ratio of the voice is about 40%, and on the other hand, in a call made using a cellular phone remarkable popularized in recent years, the call environment is often the open air, and in that case, the background noise (for example, sound from a passing automobile, conversations among persons other than the caller) is large. As a result, it is said that the voiced ratio of the voice is about 66%, the transmission amount to the line side is increased, and the transmission efficiency of the line is lowered.

The invention has an object to improve the transmission efficiency of a line by removing a background noise component of a voice signal in a voice transmission device having a tandem pass through function.

BEST MODE FOR CARRYING OUT THE INVENTION

Embodiment 1

Figure 1:
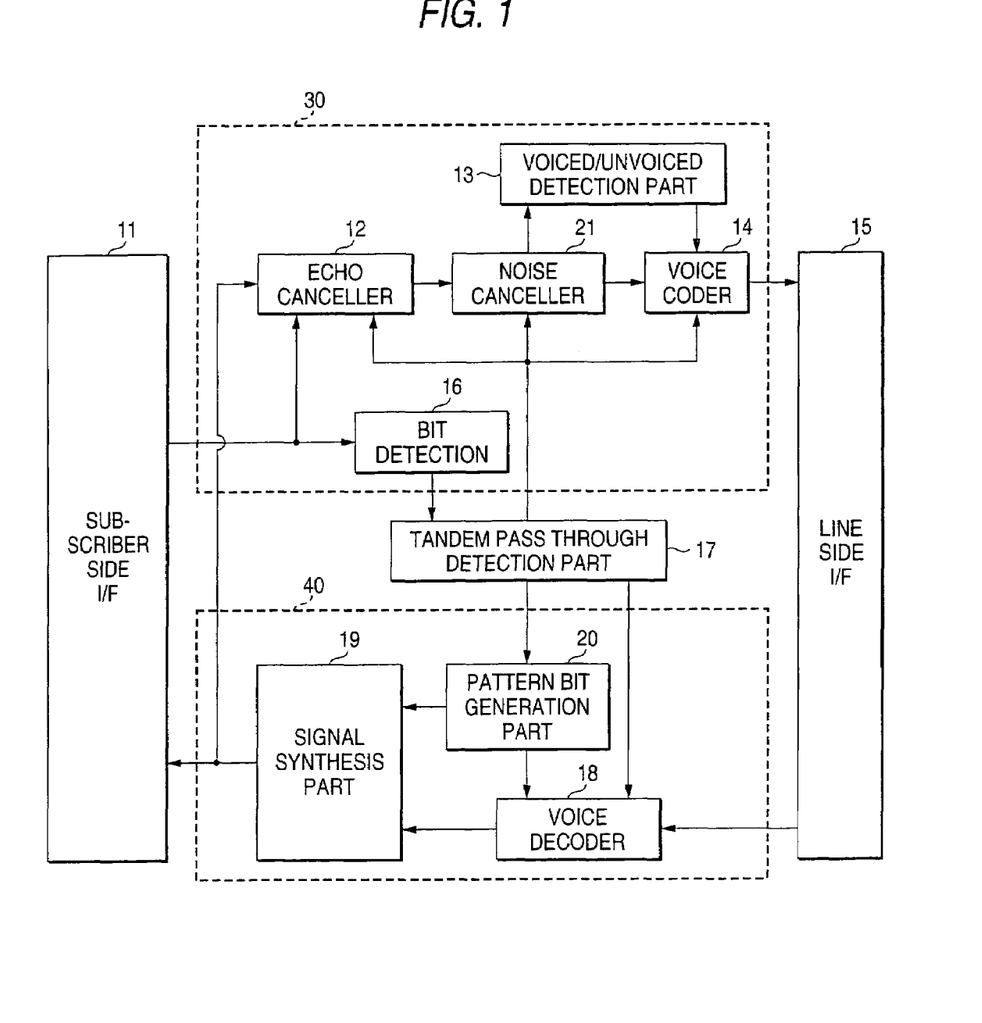
FIG. 1 is a block diagram of a DCME according to embodiment 1 of the invention.

Embodiment 1 of the invention will be described. A noise canceller is provided in a voice transmission device having a tandem pass through function, and the invention relates to the voice transmission device which performs high quality voice transmission even in a cellular phone having no noise cancel function or at both a normal time and a time of a tandem pass through state. FIG. 1 is a block diagram showing a structure of a DCME (digital circuit multiplication equipment) as a kind of the voice transmission device having the tandem pass through function according to embodiment 1 of the invention. DCMEs each shown in FIG. 1 are multistage-connected in the same form as the DCMEs 3a, 3b, 3c and 3d of FIG. 3. An establishment bit in the establishment of the tandem pass through state, extraction of a detected bit, and a detection method of the tandem pass through state are similar to the conventional ones. The respective DCMEs 3a, 3b, 3c and 3d include noise cancellers 21a, 21b, 21c and 21d, respectively.

Hereinafter, a case where a call is made between a portable terminal 1b and a terminal 1f will be described. First, a voice call signal from the portable terminal 1b is inputted to the DCME 3a through a base station apparatus 50 and an exchange 2a. The voice call signal from the exchange 2a of the subscriber side is inputted to a coding part 30a through a subscriber side I/F part 11a.

In the coding part 30a, the voice call signal is first inputted to an echo canceller 12a and a bit detection part 16a. In the echo canceller 12a, similarly to the above, an echo cancel processing is performed, and the signal after the processing is inputted to a noise canceller 21a.

Figure 2:
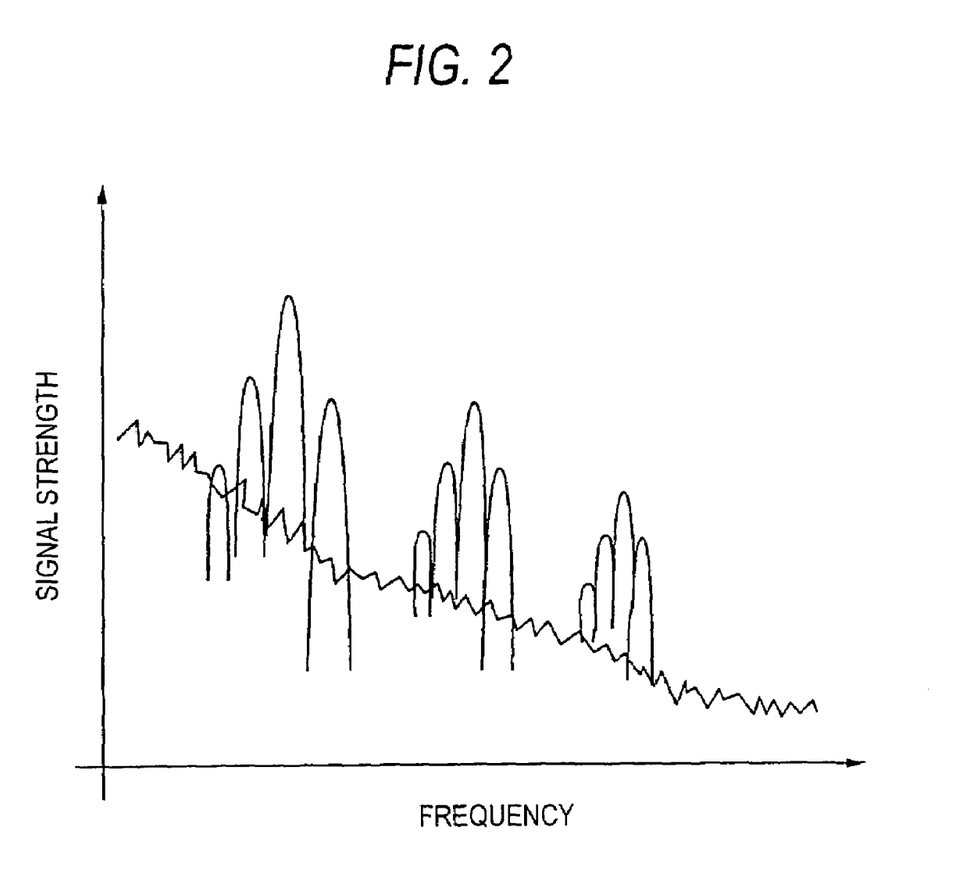
FIG. 2 is a diagram showing frequency characteristics of a background noise and a voice signal.

Conventionally, the output from the echo canceller 12a is outputted to the voice coder 14a as it is, however, in the invention, the noise canceller 21a is provided at the latter stage of the echo canceller 12a. Thus, even in the voice signal having a large background noise from the portable terminal 1b, the redundant background noise in the voice data is removed, so that it is possible to perform efficient coding in the voice coder 14a. In general, as shown in FIG. 2, a noise such as a background noise is steady in magnitude and contains many frequency components, while the frequency components of the voice signal are distributed in only specific bands. Thus, the noise canceller 21a uses the difference between statistical properties of the background noise and the voice signal to extract only the noise component, generates an opposite phase component (its phase is converted by 180 degrees) of the extracted noise component, and adds it to the original voice data, so that the noise is removed. However, since a well-known one is used in the invention, its detailed description will not be made here. In the case where the multistage connection state does not occur, the noise canceller 21a further removes the background noise or the like from the voice data after the echo cancel, and outputs it to a voiced/unvoiced detection part 13a and the voice coder 14a.

For example, in a GSM system cellular phone or the like, the noise canceller function does not exist in the inside of the body of the cellular phone, however, even in that case, the noise canceller is provided in the inside of the DCME, so that high quality voice transmission becomes possible.

The voiced/unvoiced detection part 13a judges a voiced part and unvoiced part in the voice call signal. As described above, since the redundant background noise or the like is removed by the noise canceller 21a, a portion judged to be the unvoiced part is increased, and the redundant voiced part is not outputted. The judgment result is outputted to the voice coder 14a. The voice coder 14a can perform coding of only the voiced part not containing the redundant background noise or the like from the judgment result.

On the other hand, as shown in FIG. 5, the bit detection part 16a extracts predetermined two bits in the 8-bit basic cell of the PCM signal as the voice call signal, and outputs the extracted two bits to a tandem pass through detection part 17a. The tandem pass through detection part 17a stores the extracted 2-bit signal, and similarly to the above, it is detected whether the establishment pattern of the tandem pass through state occurs. However, in this case, since the voice call signal from the portable terminal 1b is merely sent to the DCME 3a, there is no detection of the establishment pattern. Accordingly, there is no input of a control signal to stop an operation from the tandem pass through detection part 17a to the echo canceller 12a, the noise canceller 21a, and the voice coder 14a, and the echo canceller 12a, the noise canceller 21a, and the voice coder 14a continue the operation as long as the call is performed.

From the above, the voice call signal coded by the voice coder 14a is outputted to a decoding part 40b of the DCME 3b from a line side I/F part 15a by wire.

Until the tandem pass through state is established, the coded voice call signal inputted to the decoding part 40b of the DCME 3b is inputted to a voice decoder 18b in the decoding part 40b, and decoding of the voice is performed. The decoded voice is inputted to a signal synthesis part 19b, is sequentially synthesized every two bits with an establishment bit pattern indicating the establishment of the tandem pass through state, which is generated in a pattern bit generation part 20b in the decoding part 40b and is to be transmitted to the DCME 3c, and is outputted to a coding part 30c of the DCME 3c from a subscriber side I/F part 11b by wire. The establishment bit pattern is a specific pattern constructed of a predetermined number of bits, and is sequentially embedded every two bits in the 8-bit basic cell of the PCM signal as the voice call signal.

On the other hand, in the case where the tandem pass through state is established between the DCME 3b and the DCME 3c, the operation of the voice decoder 18b is stopped by the control signal from the tandem pass through detection part 17b.

The detailed operation at the time when the tandem pass through state is established is as described in the background art.

When the detected bit pattern is outputted from the coding part 30b of the DCME 3b to the decoding part 40c of the DCME 3c, and the detected bit pattern from the coding part 30c of the DCME 3c is inputted to the decoding part 40b of the DCME 3b, the tandem pass through detection part 17b first judges that the tandem pass through state is established, outputs the control signal to the echo canceller 12b, the noise canceller 21, the voice coder 14b, and the voice decoder 18b to stop the operations of these, and performs a control so that the inputted signal is outputted as it is. After this, until the time of the end of the call, as long as both the coding part 30b and the decoding part 40b are in the state to output the detected bit patterns and to receive them, the operation of the echo canceller 12b, the noise canceller 21, the voice coder 14b, and the voice decoder 18b are stopped, and the input signal is outputted as it is.

The establishment operation of the tandem pass through state of the DCME 3c is also as described above. In the coding part 30c of the DCME 3c, before the settlement of the tandem pass through state, only the voiced part of the voice call signal is coded, and the signal is outputted to the decoding part 40d of the DCME 3d, and after the establishment of the tandem pass through state, the inputted signal is outputted to the decoding part 40d of the DCME 3d as it is.

In the decoding part 40d of the DCME 3d, the coded voice call signal is inputted to the voice decoder 18d through the line side I/F part 15d, is decoded by the voice decoder 18d and is outputted to the signal synthesis part 19d. In the signal synthesis part 19d, it is synthesized with the establishment bit pattern generated in the pattern bit generation part 20d in the decoding part 40d and indicating the establishment of the tandem pass through state, and the voice call signal is outputted to the terminal 1f from the subscriber side I/F part 11d through the exchange 2d. The establishment bits synthesized here and outputted to the terminal 1f are neglected at the time of voice reproduction. As stated above, the decoding parts of the respective DCMEs output the establishment bit patterns irrespective of whether the party at the other end is a terminal or another DCME.

In the above, although the operation of the outward path from the terminal 1b to the terminal 1f has been described, the return path will next be described.

A voice call signal from the terminal 1f is outputted to the coding part 30d of the DCME 3d through the exchange 2d, and similarly to the case of the DCME 3a of the outward path, the echo component is removed by the echo canceller 12d, the noise component is removed by the noise canceller 21d to decrease the useless voiced portion in the voice call signal, only the voiced part is coded by the voiced/unvoiced detection part 13d and the voice coder 14d, and the signal is outputted to the decoding part 40c of the next stage DCME 3c.

The decoding part 40c establishes the tandem pass through state as described above. Accordingly, immediately after the call start and before the establishment of the tandem pass through state, decoding of the voice is performed by the voice decoder 18c, the pattern bit generation part 20c outputs the establishment bit pattern, the establishment bit pattern is inserted in the voice call signal by the signal synthesis part 19c, and the signal is outputted to the coding part 30b of the DCME 3b. On the other hand, after the establishment of the tandem pass through state, by the control of the tandem pass through state detection part 17c, the voice decoder 18c does not perform the decoding processing, and is switched into such an operation that the inputted signal is outputted as it is. The pattern bit generation part 20c outputs the detected bit pattern to the signal synthesis part 19c. In the signal synthesis part 19c, the signal not subjected to the decoding processing and the detected bit pattern are synthesized, and are outputted to the coding part 30b of the DCME 3b.

The establishment of the tandem pass through state of the DCME 3b is as described above. In the coding part 30b of the DCME 3b, similarly to the case of the DCME 3c of the outward path, before the establishment of the tandem pass through state, a noise is removed by the noise canceller 21b, only the voiced part of the voice call signal is coded, and the signal is outputted to the decoding part 40a of the DCME 3a, and after the establishment of the tandem pass through state, the inputted signal is merely outputted to the decoding part 40a of the DCME 3a as it is.

In the decoding part 40a of the DCME 3a to which the outputted voice call signal is inputted, similarly to the above, the inputted voice call signal is decoded and is outputted to the terminal 1a. Since only the voice call signal from the terminal 1a is inputted to the coding part 30a of the DCME 3a, the tandem pass through state as stated above is not established, and accordingly, the decoding operation of the decoding part 40a of the DCME 3a is not stopped.

As described above, with respect to the establishment of the tandem pass through state, the respective decoding parts output the establishment bit patterns, the detected bit pattern is sent back in the case where the other DCME receives the establishment bit pattern, and the tandem pass through state is made to have been established during the period when the detected bit patterns are mutually outputted. Accordingly, immediately after the call start, the coded voice is transmitted plural times, however, since the tandem pass through state is immediately established, there is substantially no influence at the time of the call.

In the decoding part 40a of the DCME 3a to which the outputted voice call signal is inputted, similarly to the above, the inputted voice call signal is decoded and is outputted to the portable terminal 1b. Since only the voice call signal from the terminal 1a is inputted to the coding part 30a of the DCME 3a, the tandem pass through state is not established as stated above, and accordingly, the decoding operation of the decoding part 40a of the DCME 3a is also not stopped.

INDUSTRIAL APPLICABILITY

The invention can be applied to a voice transmission device having a tandem pass through function in an STM, ATM or IP network, and a base station of a cellular phone having no noise cancel function, or the like may be connected.

The invention claimed is:

1. A voice transmission device characterized by comprising:
   a noise canceller for removing a noise contained in a voice call signal inputted from a subscriber terminal through a subscriber side interface part;
   voiced/unvoiced detection means for judging a voiced part and an unvoiced part from the voice call signal after the noise removal;
   voice coding means for coding the voiced part of the voice call signal outputted by the noise canceller after the noise removal and for outputting it to outside through a line interface part;
   voice decoding means for decoding voice data inputted from the outside through the line interface part;
   pattern bit generation means for outputting an establishment bit pattern indicating establishment of a multistage connection state and for, after a control signal is inputted from tandem pass through state judgment means, generating and outputting a detected bit pattern which is different from the establishment bit pattern in a bit pattern and indicates a state where multistage connection is occurring;
   signal synthesis means for synthesizing an output of the voice decoding means and the establishment bit pattern or the detected bit pattern and for outputting to outside through the subscriber side interface part; and
   the tandem pass through state judgment means for, in a case where the establishment bit pattern is contained in the voice call signal inputted from the outside through the subscriber side interface part, outputting the control signal to the pattern bit generation means, and for, in a case where after the control signal is outputted and the detected bit pattern is contained in the voice call signal inputted through the subscriber side interface, stopping operations of the noise canceller, the voice coding means, and the voice decoding means, and switching them into operations to output the inputted voice call signal as it is.

2. A voice transmission system comprising plural pairs of voice transmission devices, characterized in that each pair of voice transmission devices include two voice transmission devices in which line interface parts thereof are connected to each other by wire,
   between one pair of the voice transmission devices and the other pair of the voice transmission devices, subscriber side interface parts thereof are connected to each other by wire, and
   each of the voice transmission devices comprises:
   a noise canceller for removing a noise contained in a voice call signal inputted from a subscriber terminal through a subscriber side interface part;
   voiced/unvoiced detection means for judging a voiced part and an unvoiced part from the voice call signal after the noise removal;
   voice coding means for coding the voiced part of the voice call signal outputted by the noise canceller after the noise removal and for outputting it to outside through a line interface part;
   voice decoding means for decoding voice data inputted from the outside through the line interface part;
   pattern bit generation means for outputting an establishment bit pattern indicating establishment of a multistage connection state and for, after a control signal is inputted from tandem pass through state judgment means, generating and outputting a detected bit pattern which is different from the establishment bit pattern in a bit pattern and indicates a state where multistage connection is occurring;
   signal synthesis means for synthesizing an output of the voice decoding means and the establishment bit pattern or the detected bit pattern and for outputting to outside through the subscriber side interface part; and
   the tandem pass through state judgment means for, in a case where the establishment bit pattern is contained in the voice call signal inputted from the outside through the subscriber side interface part, outputting the control signal to the pattern bit generation means, and for, in a case where after the control signal is outputted and the detected bit pattern is contained in the voice call signal inputted through the subscriber side interface, stopping operations of the noise canceller, the voice coding means, and the voice decoding means, and switching them into operations to output the inputted voice call signal as it is.

* * * * *